United States Patent [19]

Trevedy

[11] 4,075,035
[45] Feb. 21, 1978

[54] TEMPERATURE DETECTING DEVICE FOR A FURNACE

[75] Inventor: Jean-Louis Trevedy, Metz, France

[73] Assignee: Institut de Recherches de la Siderurgie Francaise (IRSID), St. Germain-en-Laye-Cedex, France

[21] Appl. No.: 644,324

[22] Filed: Dec. 24, 1975

[30] Foreign Application Priority Data

Jan. 17, 1975 France .................. 75 01378

[51] Int. Cl.² .......................... G01K 1/08; H01V 1/30
[52] U.S. Cl. ................................... 136/210; 136/230; 136/234; 73/359 R
[58] Field of Search .................. 136/210, 230, 234; 73/359; 340/228 R

[56] References Cited

U.S. PATENT DOCUMENTS

| 3,530,716 | 9/1970 | Truppe et al. ................. 136/234 |
| 3,763,704 | 10/1973 | Blau et al. ................... 136/234 |
| 3,780,583 | 12/1973 | Proferl et al. ................ 136/234 |
| 3,862,574 | 1/1975 | Antoine et al. ................ 73/359 |
| 3,921,452 | 11/1975 | Sartorius ..................... 73/359 |
| 3,946,610 | 3/1976 | Sartorius ..................... 136/234 |

FOREIGN PATENT DOCUMENTS

| 2,308,416 | 9/1973 | Germany ...................... 73/359 |
| 315,671 | 4/1965 | Japan ......................... 73/359 |

OTHER PUBLICATIONS

Robertson, et al., "Rotating Thermocouple System", 6/71, pp. 882–883, Rev. Sci. Instrum., (USA), vol. 42, #6.

*Primary Examiner*—Nelson Moskowitz
*Attorney, Agent, or Firm*—Kurt Kelman

[57] ABSTRACT

A device for detecting the temperature in electric arc and like heat radiation producing furnaces comprises a thermally conductive, refractory tip disposed on an annular support which is mounted in the interior of a double-walled, liquid-cooled tube disposed within the tubular casing and extending along its axis. A thermocouple with a heat sensitive element adjacent the thermally conductive, refractory tip is introduced and received in the guide tube.

7 Claims, 2 Drawing Figures

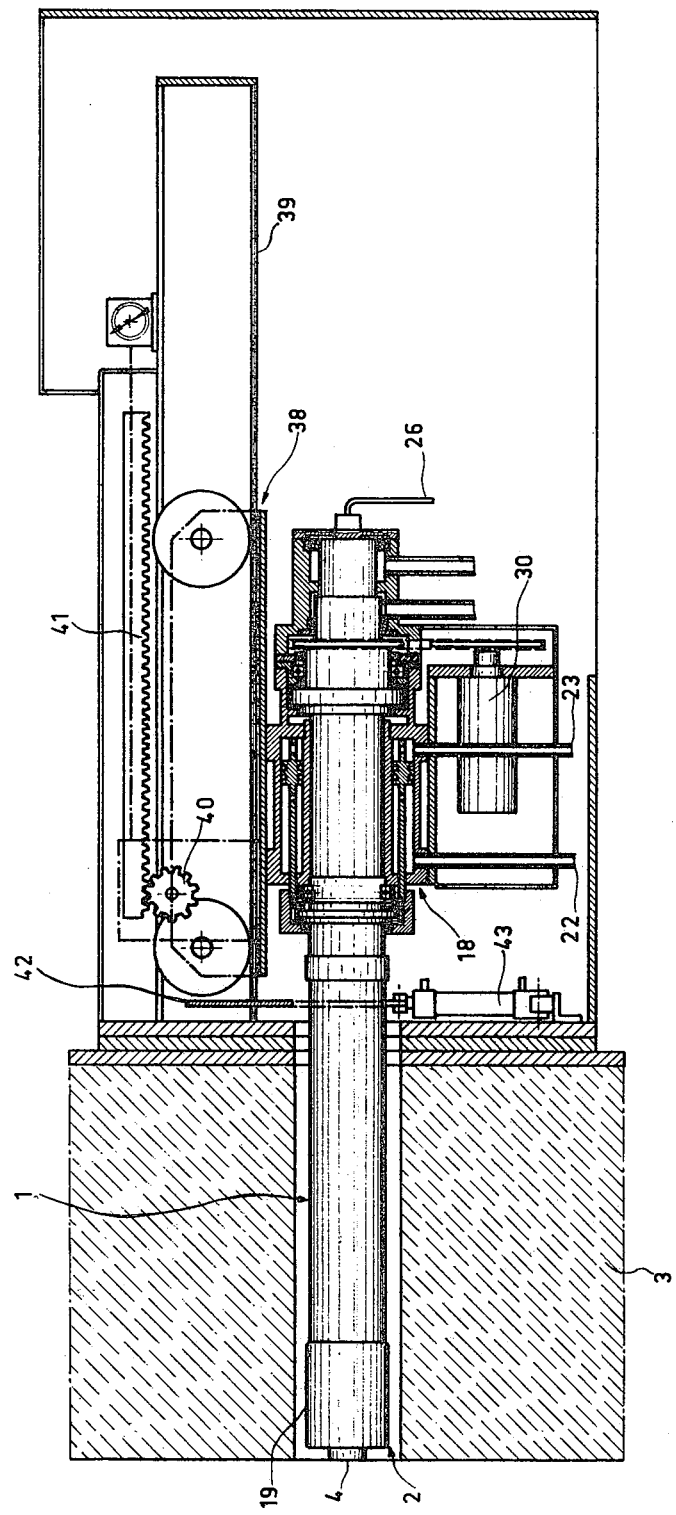
FIG_1_

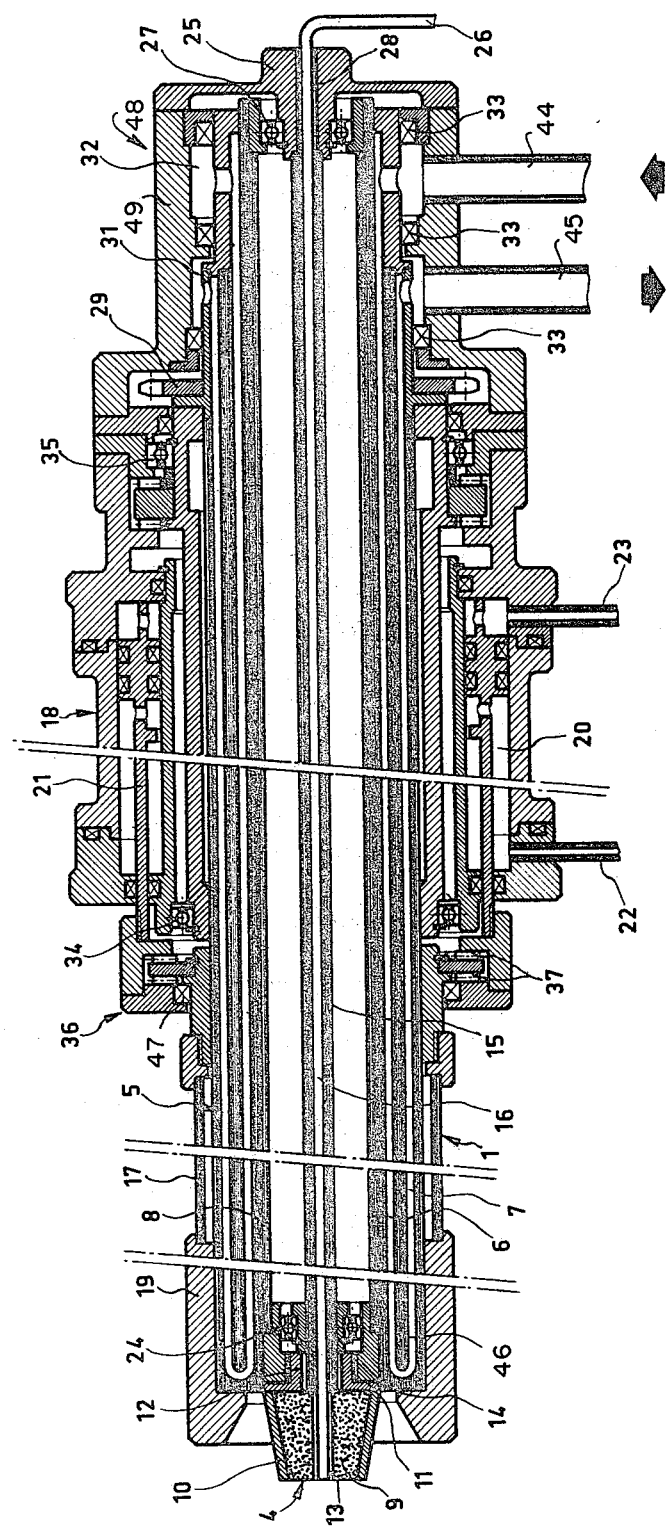
FIG_2

TEMPERATURE DETECTING DEVICE FOR A FURNACE

The present invention relates to improvements in devices for detecting the temperature in a furnace wherein heat radiation is produced, such devices being placed in the wall of such a furnace to receive information about the thermal state of the interior of the furnace and the operating conditions such state may reflect.

The development of furnace operations, such as the operation of electric arc furnaces, tends more and more towards complete automation. This requires continuing and accurate information about parameters representative of the internal state of the furnace and it is, therefore, necessary to provide suitable detecting devices in the furnace wall to be able to read these parameters.

It has been proposed, for example, to provide temperature measuring devices comprising elements of graphite or like thermally conductive, refractory material and to mount such elements at the ends of cooled metallic bodies mounted in the furnace wall. The graphite tip constitutes a heat sensitive surface following the development of the thermal state within the furnace and whose temperature may be measured by means of a thermocouple disposed adjacent thereto. Such devices must be disposed above the level of the metal bath in the furnace but they cannot be mounted too far removed from the bath if the measured temperature is to reflect the thermal state of the furnace accurately. However, it is well known that the metal bath in such furnaces, particularly in electric arc furnaces used to refine metal, is not always very quiet. In fact, numerous metallic projections rise from the bath and the atmosphere in the furnace is full of metallic vapors and particles. This causes encrustations to be formed on the furnace wall which may also cover the heat sensitive surface of the temperature detecting device or otherwise shield it from heat radiation so as to distort the temperature reading and make the obtained signals useless for the automated control of the furnace operation.

It is the primary object of this invention to provide a temperature detecting device of the indicated type which assures continuously accurate temperature readings.

The above and other objects of the invention are accomplished with a device which comprises a tubular casing having an axis and formed by a double wall concentrically surrounding the axis. The double wall defines a chamber divided by a longitudinal inner element into two concentric compartments for the circulation of a cooling fluid therethrough. A support tube having a centering ring at one end thereof is mounted in the interior of the casing. A thermally conductive, refractory tip is disposed on the centering ring and projects from the casing. The tip defines a bore coaxial with the axis of the casing and a guide tube is disposed within the support tube and extends along the casing. The support tube is maintained by the ring in alignment with the bore of the trip. The guide tube enables a thermocouple with a heat sensitive element adjacent the thermally conductive, refractory tip to be introduced and received therein.

In accordance with a preferred feature of the present invention, a mechanism is provided for axially reciprocating the thermally conductive, refractory tip. According to another preferred feature of this invention, a mechanism for rotating the tip about the axis is also provided.

The above and other objects, advantages and features of the present invention will become more apparent from the following detailed description of a now preferred embodiment thereof, taken in conjunction with the accompanying drawing wherein FIG. 1 shows a side view, in partial section, of the entire assembly including the furnace temperature detecting device and the operating mechanisms therefor; and FIG. 2 is an axial section of the device.

Referring now to the drawing, the illustrated temperature detecting device 1 has the form of a measuring stick introduced through bore 2 in furnace wall 3 so as to expose its heat sensitive tip 4 to the thermal radiation produced in the furnace. The illustrated embodiment has parts which are reciprocable in the direction of, and rotatable about, the axis of the device, as will be more fully described hereinafter, but it should be understood that the device will operate with these parts in fixed position, too, to give the same information about the temperature prevailing in the interior of the furnace as long as the temperature sensitive tip 4 is exposed to the thermal radiation within the furnace under good conditions.

The temperature detecting device comprises double-walled tubular casing 5, the two metallic walls of the casing defining an annular chamber therebetween for the circulation of a cooling liquid. The casing chamber is longitudinally divided into compartments 6 and 7 by tubular element 46 and the compartments are respectively in communication with annular chambers 32 and 31 at one end while they communicate with each other at the other end of the casing near tip 4. Cooling liquid delivery conduit 44 is mounted in housing 48 and is connected to annular chamber 32 to supply the liquid compartment 6 and, after the cooling liquid flows along compartment 6 towards tip 4 and through compartment 7 countercurrently, it is discharged from annular chamber 31 into discharge conduit 45. In this manner, both metallic walls of casing 5 are effectively cooled, the temperatures near the inner end of the casing adjacent the interior of the furnace being such that, without cooling, serious deteriorations would soon occur in the metal walls.

Tubular support 8 is disposed in the interior of casing 5 in contact with the interior wall of the casing. Centering ring 14, fitted in the tubular support 8, has an axial bore which receives metallic plug 12 which, in turn, has a coaxial bore. This bore receives guide tube 15 extending along the axis of device 1 throughout its length and projecting therefrom into coaxial bore 13 of thermally conductive, refractory head 9 which is thus mounted at the interior end of casing 5 for exposure to the heat radiation in the interior of the furnace. A good heat conducting refractory material is graphite and head 9 may be of graphite. As shown, this graphite head may be protected by metal sheath 10 spot-welded to metal disc 11 carrying, or integral with, sleeve 10. In this manner, a readily replaceable tip assembly 4 is formed by sleeve 10, disc 11, plug 12 and head 9. When head 9 has been worn out and requires replacement, the nipple assembly may be readily removed by axially pulling it from centering ring 14 and a new assembly may be put into place simply by placing a new assembly on the guide tube.

The opposite end of tubular casing 5 of the temperature detecting device is closed by housing 48 comprised of cylindrical jacket 49 and closure disc 25 whose hub 28 defines an axial bore which is coaxial with axial conduit 16 defined by guide tube 15. Entry conduit 26 is mounted in the bore of the closure disc to communicate with the conduit in the guide tube so that a thermocouple may be introduced into the device through conduits 26 and 16 so that the heat-sensitive element thereof may permanently indicate the temperature of graphite head 9 in a manner well known per se.

In the illustrated embodiment, the temperature detecting device 1 is provided with striker means surrounding casing 5 and comprising tubular flange 17 affixed to sleeve 19, both being axially reciprocated on tubular casing 5 to enable the sleeve to jut out of of furnace wall 3. In operation, a crust of slag or dross may accumulate on the furnace wall around bore 2 in the furnace wall so as to cover up or shield the heat sensitive tip of device 1, thus completely distorting the temperature measurement. Such crust formations may be broken up by axially reciprocating sleeve 19.

The illustrated reciprocating mechanism comprises double acting hydraulic jack 18 concentrically surrounding tubular casing 5 and annular connecting assembly 36 which connects flange 17 to annular piston 21 of the hydraulic jack. In the drawing, the sleeve 19 is shown in retracted position wherein tip 4 is flush with furnace wall 3. However, when hydraulic fluid is supplied through conduit 23 to one of the cylinder chambers of jack 18, piston 21 is axially moved to push the sleeve forwardly into the interior of the furnace, breaking up any slag crust that may have accumulated around bore 2 and exposing graphite element 9 to the heat radiation in the interior of the furnace. The double-acting jack will retract the nipple assembly into its illustrated position by delivering hydraulic fluid into the other cylinder chamber through conduit 22. While reciprocation of the cleaning means of the temperature detecting device will be essential under operating conditions which cause the accumulation of slag and the like, or otherwise preclude free access of the heat radiation to tip 4, it will not be required under quiet operating conditions where no such accumulations arise. In its most basic form, device 1 is simply a measuring stick consisting of a series of concentric tubes serving to support a heat sensitive tip exposed to the heat radiation in a furnace and a thermocouple capable of indicating the temperature of the tip.

While the above-described temperature detecting device will work well under many conditions, it will be understood that the most accurate and effective temperature measurement depends on the proper exposure of the surface of graphite tip 4 to the heat radiation in the interior of the furnace. Slag or metal encrustations on the surface of the graphite will interfere with proper temperature measurement and, to prevent any such materials from adhering to the graphite surface and from forming a coating thereon, it is a further preferred feature of the present invention to provide a mechanism for the rapid rotation of the graphite tip about its axis so as to throw off any accumulations on the surface of the tip by centrifugal force. While it would be sufficient to rotate solely tip 4, practical considerations make it advisable to rotate the tubular casing of the device with the tip, or even the entire assembly of cooled casing 5 support tube 8, flange 17 and reciprocable sleeve 19. On the other hand, it is preferred for reasons of simplicity of construction and assembly to maintain guide tube 15 and the thermocouple arranged therein stationary.

The mechanism for rotating the assembly about the longitudinal axis of device 1, which it concentrically surrounds, comprises ball bearings 24 and 27 respectively encased in centering ring 14 and a like centering at the other end of support tube 8. These ball bearings permit the centering rings casing to rotate about guide tube 15, thereby rotating the casing support tube 8 and tip 4. While, as has been indicated hereinabove, it is possible to rotate only centering ring 14 with tip 4 independently, it is simpler to rotate the entire assembly with casing 5 about guide tube 15.

For this purpose, the cooled tubular casing 5 carries entrainment gear 29 which, as shown in FIG. 1, is entrained by air motor 30. To enable the casing to rotate, the cooling liquid delivery system to the casing must be constructed so as to permit such rotation. This is done in a generally conventional manner by providing liquid-tight seals 33 at the points where the liquid conduits 44, 45 connect with liquid distributing chambers 31, 32 of the liquid circulation system for double-walled casing 5. While axially reciprocable sleeve 19 could be independent of the temperature detecting tip 4 of device 1, it has been illustrated as being integral therewith to form a striker assembly which rotates with casing 5. However, reciprocating jack 18, which is connected to sleeve 19, must remain stationary. These relative movements are made possible by the following arrangements: on the one hand, the striker assembly is mounted for rotation independently of jack 18, to which it is attached, by providing annular joint 47 and needle bearing 37 between connecting assembly 36 and annular piston 21; and on the other hand, ball bearings 34, 35 mount the jack on the casing which it concentrically surrounds. Thus, at the level of jack 18, device 1 comprises guide tube 15, which is stationary, a plurality of concentric rotary elements about the stationary tube, and stationary annular jack 18 concentrically surrounding the rotary elements.

In addition to providing mechanisms for reciprocating and rotating the heat sensitive tip of device 1, a mechanism is also provided to remove the entire temperature probe out of bore 2 in furnace wall 3, as is shown in FIG. 1. For this purpose, temperature detecting device 1 is mounted on carriage 38 movable in an axial direction on rails 39, a rack-and-pinion drive 40, 41 being provided to entrain the carriage along the rails. The axial displacement of device 1 may be effected to withdraw the entire device from bore 2 or merely to adjust the position of tip 4 as the furnace wall becomes worn down so as to maintain the heat sensitive tip flush with the wall. While the former displacement may be effected in a single stroke, the latter displacement may be programmed in accordance with the amount of wall erosion established experimentally to proceed slowly. When the entire device is withdrawn from bore 2, the bore may be shut by gate 42 operated by jack 43.

While a preferred embodiment has been described and illustrated, it will be obvious to those skilled in the art that variations and modifications may readily be effectuated to adapt the device to different operating conditions. Thus, where rotation of the device is provided, the rotary speed may be of the order of 500 rpm but this speed may be changed to take into consideration the nature and intensity of any deposits on the heat sensitive tip of the device. Also, as mentioned, no rotation and/or reciprocation may be necessary under certain operating conditions.

The described and illustrated temperature detecting device is particularly suited to indicate the internal thermal state of electric arc furnaces.

I claim:

1. A device for detecting the temperature in a furnace wherein heat rediation is produced, which comprises
   a. a tubular casing having an axis and formed by a double wall concentrically surrounding the axis, the double wall defining an elongated chamber,
   b. a longitudinal tubular element disposed in the chamber and dividing the chamber into two concentric compartments for the circulation of a cooling fluid therethrough,
   c. a support tube disposed coaxially in the tubular casing and in contact with the double wall thereof,
   d. a centering ring at one end of the support tube,
   e. a thermally conductive, refractory tip disposed on the centering ring and projecting from the casing, the tip defining an axial bore,
   f. a guide tube disposed within the support tube and extending along the casing, the guide tube being maintained by the centering ring in alignment with the bore of the tip and enabling a thermocouple with a heat sensitive element adjacent the tip to be introduced and received therein,
   g. clearing means surrounding the casing and comprising an annular striker assembly mounted on the casing, and
   h. a mechanism for axially reciprocating the striker element.

2. The temperature detecting device of claim 1, wherein the two compartments are in communication with each other at one end thereof adjacent the one end of the support tube, and a cooling fluid inlet and outlet in communication with a respective one of the compartments at the other end thereof whereby the cooling fluid flows countercurrently through the compartments.

3. The temperature detecting device of claim 1, wherein the annular striker assembly comprises a sleeve surrounding the casing at an end thereof near the tip and a tubular flange affixed to the sleeve.

4. The temperature detecting device of claim 3, wherein the reciprocating mechanism comprises an annular jack including a piston and an annular connecting assembly, the jack and connecting assembly concentrically surrounding the casing and the connecting assembly connecting the piston of the jack to the tubular flange.

5. The temperature detecting assembly of claim 1, further comprising a mechanism for rotating the thermally conductive tip about the axis of the bore.

6. The temperature detecting assembly of claim 5, wherein the rotating mechanism includes motor means acting upon the tubular casing, the support tube and striker assembly being arranged to be rotated by the casing.

7. The temperature detecting device of claim 6, further comprising means for circulating the cooling liquid through the chamber of the tubular casing, the liquid circulating means being arranged to permit rotation of the tubular casing.

* * * * *